INVENTORS
Joseph J. Domicone
Jack E. Mounteer
BY
Clarence R. Patty, J.
ATTORNEY

United States Patent Office 3,266,964
Patented August 16, 1966

3,266,964
METHOD FOR SEALING CAVITIES IN ARTICLES
Joseph J. Domicone, Elmira, and Jack E. Mounteer, Corning, N.Y., assignors to Corning Glass Works, Corning, N.Y., a corporation of New York
Filed Nov. 20, 1963, Ser. No. 325,099
10 Claims. (Cl. 156—69)

This invention relates to methods for forming protective closures across the rims of cavities in hollow articles.

It is an object of the invention to provide a method whereby cavities in articles may be quickly and inexpensively sealed against contamination.

A more particular object of the invention is the provision of a method whereby the cavities of hollow glass articles, such as envelopes for incandescent electric light bulbs, can be sealed against contaminants, such as particles of broken glass and dust, during shipment from the manufacturer of the glass bulb envelopes to the manufacturer of the finished light bulbs.

These and other objects, which will be apparent from the detailed description of the invention, are accomplished by a method wherein the rim defining a cavity of an article is heated and pressed through a thin thermoplastic film in order to cause the heated rim to separate the film and to effect a seal with a separated portion of the film covering the cavity.

Figure 1:
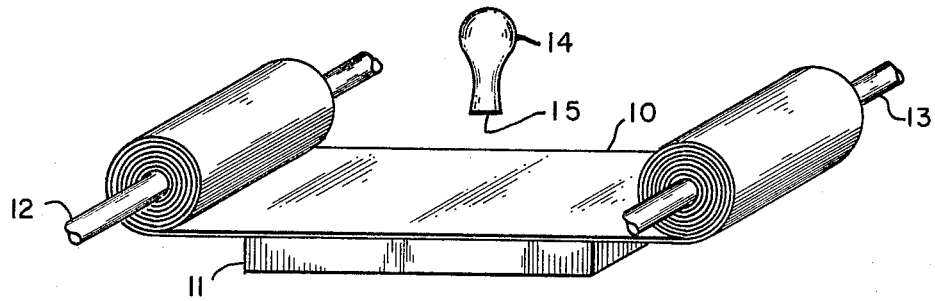
Figure 2:
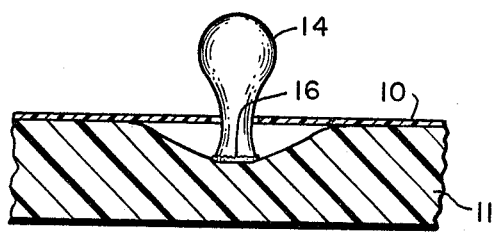
Figure 3:
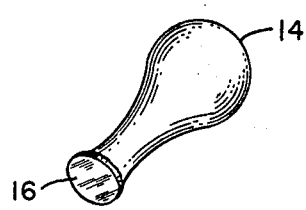

The invention will be described with reference to the accompanying drawing, in which:

FIGURE 1 is a schematic representation of one form of apparatus useful in carrying out the process of the present invention, FIGURE 2 is a sectional view through a portion of the apparatus of FIGURE 1, illustrating the manner in which a portion is caused to separate from a sheet of thermoplastic material and to adhere to the rim surrounding the opening in an envelope for an incandescent electric light bulb, and FIGURE 3 is a perspective view of the envelope of FIGURE 2, illustrating the thermoplastic coating covering the opening therein.

Although various forms of apparatus may be employed for carrying out the process of the present invention, for purposes of illustration FIGURES 1 and 2 disclose one means for continuously feeding and supporting a thin sheet of thermoplastic material. A roll comprising polyethylene film 10 having a thickness of 1 mil is drawn across the top surface of a resilient material 11, such as polyurethane foam plastic having a thickness of 2 inches. The rotation of rollers 12 and 13 is regulated to maintain the sheet of film continuously in tension therebetween, and the film is in contact with the upper surface of the resilient material 11. Glass envelope 14, which is the type used in the manufacture of incandescent electric light bulbs, is positioned above the film. The bulb has previously been heated to raise the temperature of its rim 15 to approximately 120° C.

The manner in which the glass envelope is caused to separate a portion of the film from the sheet thereof and to effect a seal between the separated portion and the rim of the glass envelope is illustrated in FIGURE 2. Bulb 14 is pressed through sheet 10 toward resilient material 11. Due to the fact that sheet 10 is maintained in tension, the sheet tends to maintain its position as the rim of the glass envelope is passed therethrough. Thus, while the separated portion 16 of the film is caused to adhere to rim 15 of the glass envelope and to move along with the rim, the remainder of the film tends to retain its original orientation. In this manner, a seal is effected between the rim and only the portion of the film which covers the rim and the opening defined thereby, as illustrated in FIGURE 3.

Adherence of the film to the rim of the envelope is increased when the heated rim, prior to contact with the film, is dipped into a 10% solution in toluene of a mixture of 60% paraffin and 40% of a copolymer of ethylene and vinyl acetate, sold by the Du Pont Company under the trademark ELVAX.

Thermoplastic films other than polyethylene may be employed as sealing films in the process of the present invention. Other such films are polypropylene, nylon film and vinylidene dichloride. The optimum temperatures to which rim 15 must be heated on order to effect sealing with the film will vary according to the film employed. In general, the optimum rim temperature will be approximately equal to the softening temperature of the film, although higher temperatures may be employed.

Although the seal between the rim and the thermoplastic film is preferably effected by pressing the film against a resilient backing material, such material is not essential. Resilient material 11 of FIGURE 1 may be omitted, and the film supported solely by the tension of rollers 12 and 13. Alternatively, resilient material 11 may be replaced by a rigid material, in which case rim 15 will not be caused to pass through the film 10 but rather will contact the film, become sealed thereto and subsequently separate from the sheet when the glass envelope is removed vertically upward. According to the invention, it is sufficient that the rim which is to be sealed be heated and that the sheet of film be suspended so that, after a portion thereof is separated therefrom by the heated rim, the remainder of the sheet is restrained from moving along with the rim as it is either passed through the sheet or withdrawn therefrom.

Although the process of the present invention has been illustrated with reference to its utility in sealing an opening in a glass article, the process is similarly applicable to the sealing of openings in articles of other compositions, for example metals and plastics.

Inasmuch as the foregoing description has been provided solely as that of a preferred embodiment of the present invention, it is intended that the scope of the invention be limited only by the scope of the appended claims.

We claim:

1. The method of forming a closure across an opening defined by a rim of an article which comprises the steps of providing a sheet of thermoplastic material, heating said rim at least to the softening temperature of said thermoplastic material, bringing said rim into contact with said sheet to soften a part of said sheet in contact with said rim and to seal said part to said rim, and moving said rim in a direction transverse to said sheet to separate from said sheet a portion of said sheet defined by said part.

2. The method of forming a closure across an opening defined by a rim of an article which comprises the steps of providing a sheet of thermoplastic material, heating said rim at least to the softening temperature of said thermoplastic material, bringing said rim into contact with said sheet to soften a part of said sheet in contact with said rim and to seal said part to said rim and passing said rim through said sheet to detach from said sheet a portion of said sheet defined by said part.

3. The method according to claim 2 in which said thermoplastic material comprises polyethylene.

4. The method of closing an opening defined by a rim of an article which comprises the steps of providing a sheet of thermoplastic material, heating said rim at least to the softening temperature of said thermoplastic material and passing said rim through said sheet to cause a portion of said sheet to be separated from said sheet and to adhere to said rim.

5. The method of forming a closure across an opening defined by a rim of an article which comprises the steps of providing a sheet of thermoplastic material, maintaining said sheet in tension, heating said rim at least to the softening temperature of said thermoplastic material, bringing said rim into contact with said sheet to soften a part of said sheet in contact with said rim and to seal said part to said rim and moving said rim in a direction transverse to said sheet to separate from said sheet a portion of said sheet defined by said part.

6. The method of forming a closure across an opening defined by a rim of an article which comprises the steps of providing a sheet of thermoplastic material, supporting said sheet in tension across a resilient material, heating said rim at least to the softening temperature of said thermoplastic material, bringing said rim into contact with said sheet to soften a part of said sheet in contact with said rim and to seal said part to said rim, and passing said rim through said sheet to press said part against said resilient material to separate from said sheet a portion of said sheet defined by said part.

7. The method of forming a closure across an opening defined by a rim of a glass article which comprises the steps of providing a sheet of thermoplastic material, heating said rim of said glass article at least to the softening temperature of said thermoplastic material, bringing said rim into contact with said sheet to soften a part of said sheet in contact with said rim and to seal said part to said rim, and moving said rim in a direction transverse to said sheet to separate from said sheet a portion of said sheet defined by said part.

8. The method of forming a closure across an opening defined by a rim of a glass article which comprises the steps of providing a sheet of thermoplastic material, supporting said sheet in tension across a resilient material, heating said rim at least to the softening temperature of said thermoplastic material, bringing said rim into contact with said sheet in order to soften a part of said sheet and to seal said part to said rim, and pressing said part against said resilient material in order to separate from said sheet a portion defined by said part.

9. The method according to claim 8 in which said thermoplastic material comprises polyethylene.

10. The method of forming a closure across an opening defined by a rim of a glass envelope for an incandescent electric light bulb which comprises the steps of providing a sheet of thermoplastic material, supporting said sheet in tension across a resilient material, heating said rim at least to the softening temperature of said thermoplastic material, bringing said rim into contact with said sheet in order to soften a part of said sheet and to seal said part to said rim, and pressing said part against said resilient material in order to separate from said sheet a portion defined by said part.

References Cited by the Examiner

UNITED STATES PATENTS 3,119,216    1/1964    Held _____ 53—39

EARL M. BERGERT, *Primary Examiner.*

D. J. DRUMMOND, *Assistant Examiner.*